May 11, 1926.
H. C. MUMMERT ET AL
AIRPLANE LANDING GEAR
Filed Feb. 29, 1924      2 Sheets-Sheet 1
1,584,466
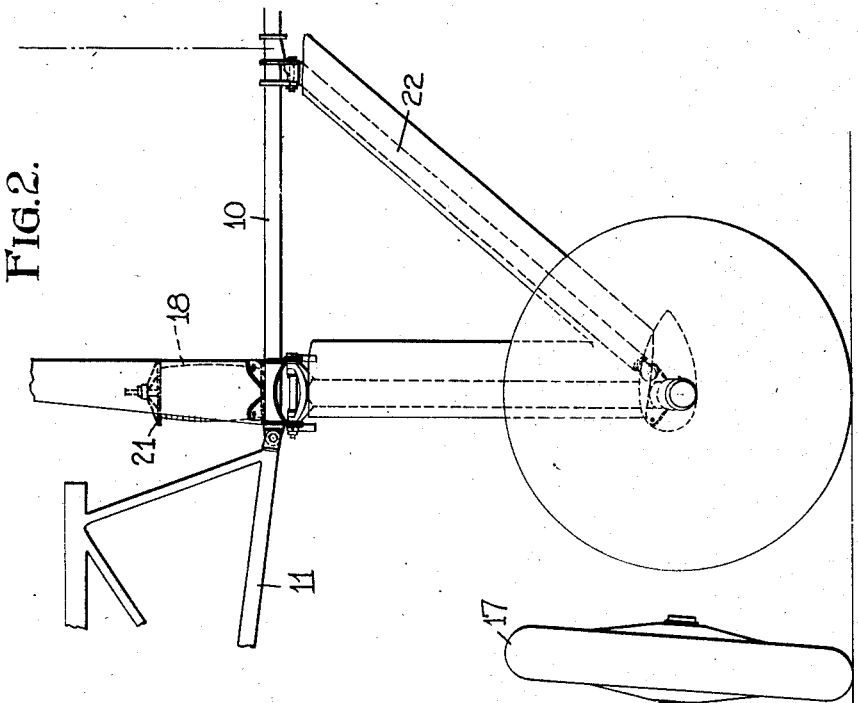
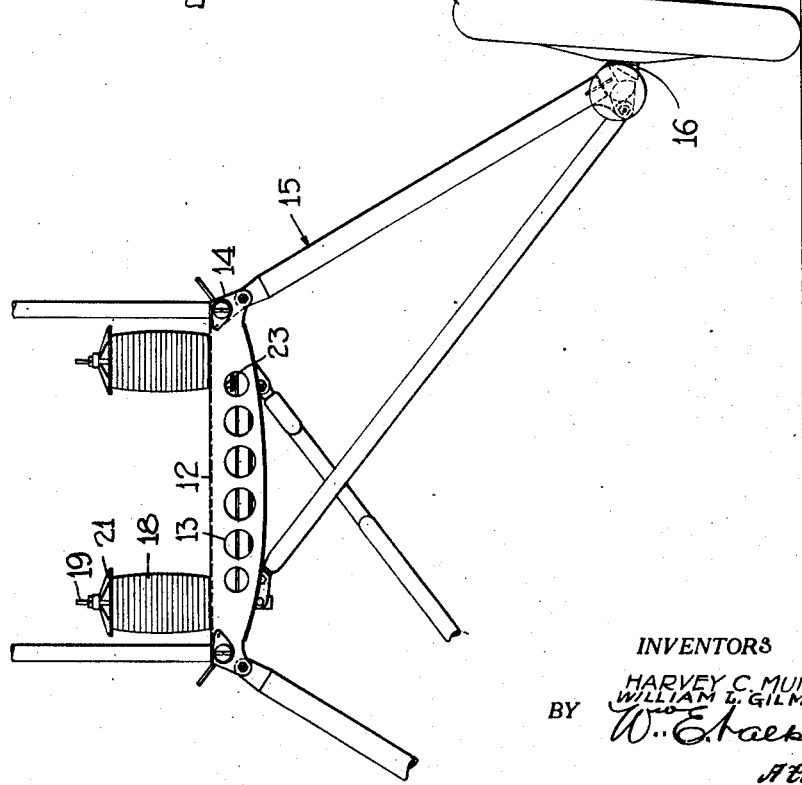
INVENTORS
HARVEY C. MUMMERT AND
WILLIAM L. GILMORE.
BY
Attorney May 11, 1926.

H. C. MUMMERT ET AL

AIRPLANE LANDING GEAR

Filed Feb. 29, 1924  2 Sheets-Sheet 2

1,584,466

INVENTORS
HARVEY C. MUMMERT and
WILLIAM L. GILMORE
BY
ATTORNEY

Patented May 11, 1926.

1,584,466

UNITED STATES PATENT OFFICE.

HARVEY C. MUMMERT, OF HOLLIS, AND WILLIAM L. GILMORE, OF MINEOLA, NEW YORK, ASSIGNORS TO CURTISS AEROPLANE AND MOTOR COMPANY, INC., OF GARDEN CITY, NEW YORK, A CORPORATION OF NEW YORK.

AIRPLANE LANDING GEAR.

Application filed February 29, 1924. Serial No. 695,962.

Our invention relates to launching and landing gears for aircraft and is characterized by improvements in the construction and relative arrangement of the various landing gear parts. The shock absorbing mechanism, instead of being mounted at the foot of the landing gear struts, is carried wholly within the fuselage or body and the struts (viewed from either the front or rear) collectively define what are in effect at least substantially triangular frames. Each triangular frame, of which there are two, (preferably arranged in overlapping relation) is pivotally mounted with its pivot axis disposed at the apex of one of the included angles of the triangle. The landing devices (wheels, if a land machine and pontoons, if a hydro-machine) instead of being mounted on axle ends, as is conventional, are mounted one each at the apices of other of the included angles of said triangles, whereas the shock absorbing mechanism, wholly enclosed, is mounted at or near the apex of each third included angle thereof. Thus organized an axle or other cross-connection between the landing devices is entirely eliminated, and the landing gear as a whole is rendered unusually free from head resistant surfaces. In eliminating the axle, many accidents heretofore common, due to vegetation coming in contact with and wrapping itself around the axle causing the machine to nose over, are avoided. Preferably the shock absorbing mechanism comprises wholly independent groups of super-imposed rubber discs so related to the independently yielding triangular frames as to be partially or fully compressed according to the extent to which the landing devices are displaced in actual operation.

Other objects, advantages, and improved results will be hereinafter set forth.

In the drawings, wherein like reference characters denote like or corresponding parts, Fig. 1 is a front elevation of the landing gear, partly broken away, showing the manner in which the triangular frames thereof laterally overlap;

Fig. 2 is a side elevation;

Figure 3:
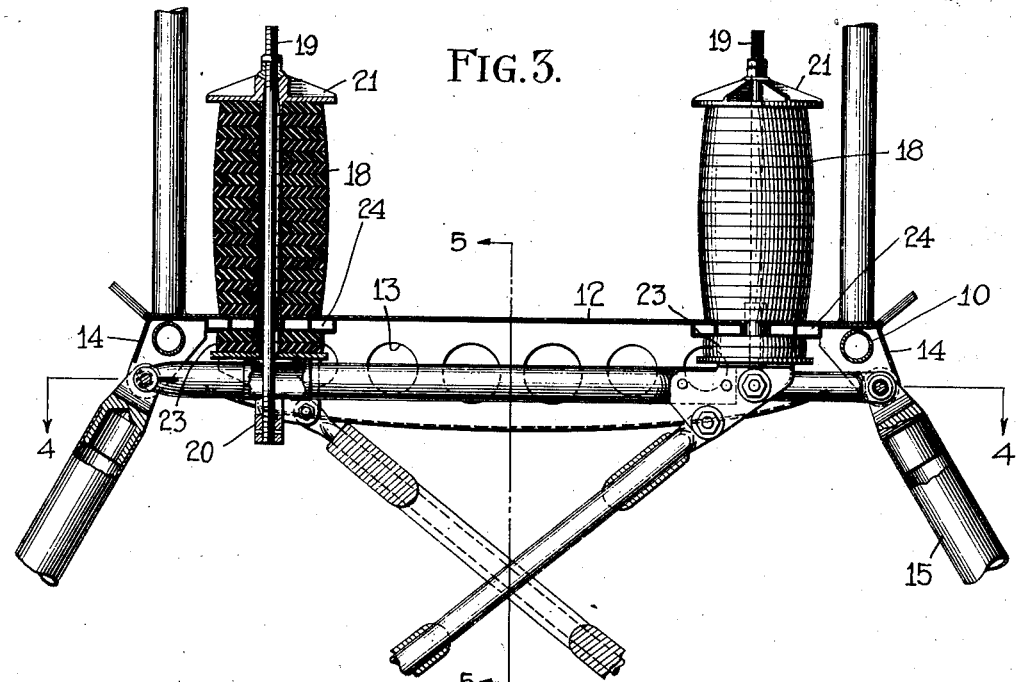
Fig. 3 is a detail transverse vertical sectional view of a portion of the landing gear showing the relative arrangement of the independently functioning shock absorbing devices.
Figure 4:
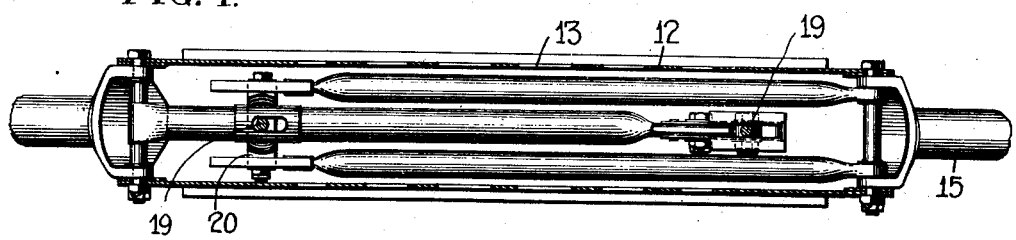
Fig. 4 is a section on the line 4—4 of Fig. 3.
Figures 5, 6:
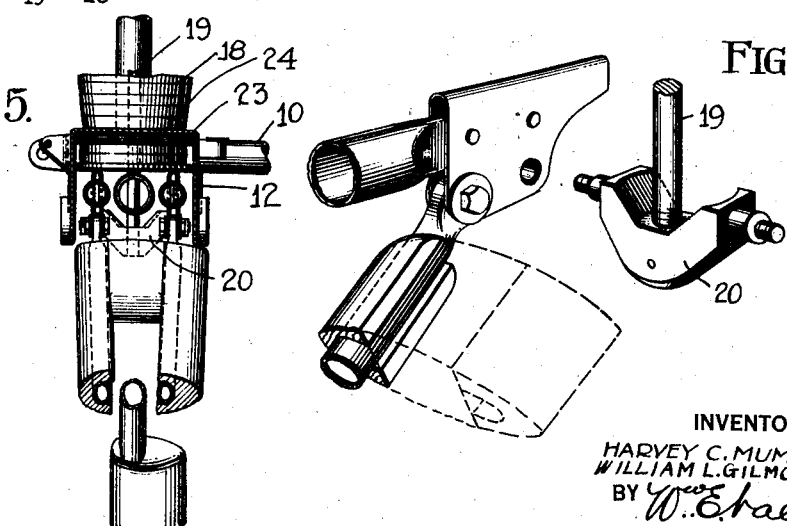
Fig 5 is a section on the line 5—5 of Fig. 3.
Fig. 6 is a fragmentary perspective view of one of the landing gear fittings.

In the embodiment of the invention selected for illustration, 10—10 designate the two lower longérons of the airplane fuselage or body, 11 the engine mounting and 12 a fuselage frame member, preferably of channelled section and appropriately lightened as indicated at 13. Said frame member 12 extends across the fuselage from one to the other of the longérons 10 thereof with its open side facing downwardly. At its opposite ends it is provided with fittings 14—14 to and within which the frames of the landing gear, designated each in its entirety as 15, are pivoted. Said frames 15, viewed from either the front or rear, are triangular, preferably obtuse-triangular, and so related one to the other as to laterally overlap at their inner or upper ends. At the apex of the obtuse-angle of each frame 15, said frames are pivoted, the pivot axes being extended in a fore and aft direction to the end that the frames 15 may be laterally and vertically displaced. The frames 15 are in no way interconnected, i. e., each frame is independently movable, independently mounted, and each is provided with its individual shock absorbing means. Being of obtuse-angular formation the said frames 15 diverge downwardly, each said frame at the apex of the lower included angle thereof being provided with an axle stub 16 upon which landing gear wheels 17 (if a land machine) are mounted.

The shock absorbing mechanism for each triangular frame is the same in each instance. Said mechanism, as herein illustrated, preferably includes a superimposed tier of rubber discs 18 thru the center of which a retaining pin 19 extends vertically. Each pin 19 is anchored at its lower end to the frame with which it is associated by means of a cradle 20 carried by the frame. It is extended upwardly thru the fuselage frame member 12 and carries at or near its upper end an adjustable head block 21 between which and the said frame member 12 the tier of rubber discs 18 are mounted. Thus organized it is obvious that upon the application of a load upon the wheels 17 of the landing gear the discs 18 are compressed to an extent determined by the magnitude of such load. Each frame 15 being rigid, vertical displacement thereof is at all times resisted by the shock absorbing mechanism. Preferably said mechanism is wholly enclosed within the fuselage or body of the machine and it is disposed at or near the apex of the third included angle of the triangular frame with which such mechanism is associated.

To the end that the said two triangular frames may be mounted one in direct opposition with the other, each said frame, throughout a portion of the length of one of the sides thereof is centrally divided whereby non-interference between the over-lapping portions of said two frames is assured. Moreover, each said frame 15 is braced in a fore and aft direction as indicated at 22, said brace at its upper end being pivoted about an axis in continuation of the pivot axis of the particular frame with which said brace is associated. If desired, to ease off the re-bound shocks, elastics 23 may be interposed between each frame 15 and the fuselage frame member 12, said frame member, at the point where the re-bound elastics engage, being strengthened as indicated at 24.

A landing gear characterized as above set forth offers less resistance, in flight, than the conventional landing gear by reason of the elimination of the direct cross-connection between the landing devices. By grouping the shock absorbing discs as indicated, the number thereof may be added to or diminished by simply removing the head blocks 21 which are threaded on the bolts 19. Moreover, by enclosing the shock absorbing mechanism wholly within the fuselage or body of the machine, such mechanism, in and of itself offers no resistance whatsoever.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What is claimed is:

1. An airplane landing gear including a laterally movable substantially triangular frame, said frame being pivotally mounted with its pivot axis extended in a fore and aft direction and disposed at the apex of one of the included angles of the triangle, a landing device mounted at the apex of the other of the included angles of the triangle, said landing device being bodily movable with said frame, and means associated with said frame and disposed at or near the apex of the third included angle of said triangle to resist its pivotal movement.

2. An airplane landing gear including a laterally movable obtuse-angular frame, said frame being pivotally mounted with its pivot axis extended in a fore and aft direction and disposed at the apex of the obtuse-angle of the triangle, a landing device mounted at or near the apex of one of the other of the included angles of said triangle, said landing device being bodily movable with said frame, and means associated with said frame and disposed at or near the apex of the third included angle of said triangle to resist its pivotal movement.

3. An airplane landing gear including separate laterally movable triangular frames, both said frames being pivotally mounted with their respective pivot axes extended in a fore and aft direction and disposed at the corresponding apices of one each of the included angles of said triangles, landing devices mounted one each at the corresponding apices of one of the other of the included angles of said triangles, said landing devices being bodily movable respectively with said frames, and means associated with each said frame and disposed respectively at or near the apices of the third included angle of each said triangle to resist separately the pivotal movement of each said frame.

4. An airplane landing gear including separate laterally over-lapping substantially triangular frames, both said frames being pivotally mounted with their respective pivot axes disposed at the corresponding apices of one each of the included angles of said triangles, landing devices mounted one each at the corresponding apices of one of the other of the included angles of said triangles, said landing devices being bodily movable respectively with said frames, and means associated with each said frame and disposed respectively at or near the apices of the third included angle of each said triangle to resist separately the pivotal movement of each said frame.

5. An airplane landing gear including separate laterally over-lapping substantially triangular frames, said frames being independently pivotally mounted with their respective pivot axes disposed at the corresponding apices of one each of the included angles of said triangles, landing devices mounted one each at the corresponding apices of one of the other of the included angles of said triangles, said landing devices being independently bodily movable respectively with said frames, and means independently associated with each said frame to resist separately the independent pivotal movement thereof.

6. An airplane landing gear including, in combination with the body of the airplane, a laterally movable susbtantially triangular frame, said frame being pivotally mounted with its pivot axis disposed in a fore and aft drection and at the apex of one of the included angles of said triangle, a landing device mounted at the apex of one of the other of the included angles of said triangle, said landing device being bodily laterally movable with said frame, and means associated with said frame, disposed at or near the apex of the third included angle of said triangle, and wholly enclosed within said body to resist the pivotal movement of said frame.

7. An airplane landing gear including in combination with the body of the airplane, an obtuse-triangular frame, said frame being pivotally mounted at one side of said body with its pivot axis disposed at or near the apex of the obtuse-angle of said triangle, a landing device mounted at the apex of one of the other of the included angles of said triangle, said landing device being bodily movable with said frame, and means enclosed within said body and directly associated with said frame to resist its pivotal movement.

8. An airplane landing gear including, in combination with the body of the airplane, separate substantially triangular frames, said frames being pivotally mounted respectively at opposite sides of said body with their respective pivot axes disposed at the corresponding apices of one each of the included angles of said triangles, landing devices mounted, one each at the corresponding apices of one of the other of the included angles of said triangles, said landing devices being bodily movable respectively with said frame, and means associated with each said frame and disposed respectively at or near the apices of the third included angle of each said triangle to resist separately the pivotal movement of said frame, said means, in the normal position of said frames being wholly enclosed within said airplane body.

9. An airplane landing gear including, in combination with the body of the airplane, a substantially triangular frame, said frame being pivotally mounted with its pivot axis disposed at the apex of one of the included angles of the triangle, and having one of its sides normally wholly enclosed within the airplane body, a landing device mounted at the apex of one of the other of the included angles of said triangles, said landing device being bodily movable with said frame, and means associated with said frame enclosed within said body and disposed at or near the apex of the third included angle of said triangle to resist its pivotal movement.

10. An airplane landing gear including a landing device, a supporting frame therefor comprising a tension member and a compression member, and shock absorbing mechanism associated with the tension member of said frame, said mechanism comprising a super-imposed tier of substantially flat rubber discs enclosed within the airplane body.

11. An airplane landing gear including a pivotally mounted frame comprising a tension member and a compression member, a landing device carried by and movable with said frame in a lateral direction, and means associated with said frame to resist its pivotal movement, said means comprising a vertical tier of superimposed discs distantly removed from said landing device, said discs being directly associated with said tension member so as to be compressed in resisting pivotal movement of said frame.

12. An airplane landing gear including a pair of landing gear struts arranged to converge downwardly in substantially a transverse vertical plane, one of said struts being a compression strut and pivoted to move laterally about an axis extended in a fore and aft direction and the other of said struts being a tension strut and movable bodily with said compression strut, a landing device jointly carried by said struts, and means associated with said tension strut to yieldingly resist the lateral pivotal movement of said landing device.

13. An airplane landing gear including, in combination with the body of the airplane, a pair of landing gear struts arranged to converge downwardly in substantially a transverse vertical plane, one of said struts being a compression strut and pivoted to move laterally about an axis extended in a fore and aft direction and the other of said struts being a tension strut and movable bodily with said compression strut, a landing device jointly carried by said struts, and means enclosed within the airplane body and directly associated with said tension strut to yieldingly resist the lateral pivotal movement of said landing device.

14. In an airplane landing gear including, in combination with the body of the airplane, separate pairs of landing gear struts each comprising a tension strut and a compression strut, the struts of the pairs being arranged to converge downwardly in substantially a transverse vertical plane, with the tension struts in each instance overlapping, a landing device carried by each pair of struts, said landing devices being movable bodily laterally with the struts comprising the respective pairs, and shock absorbing means associated with the tension strut of each pair of struts to yieldingly resist the lateral pivotal movement of said landing device.

15. An airplane landing gear including separate laterally movable substantially triangular frames, both said frames being pivotally mounted with their respective pivot axes extended in a fore and aft direction and disposed at the corresponding apices of one each of the included angles of said triangles, landing devices mounted one each at the corresponding apices of one of the other of the included angles of said triangles, said landing devices being pivotally movable respectively with said frames, and means associated with said frames and disposed at or near the apices of the third included angle of each said triangle to yieldingly resist the pivotal movement of said frames.

16. The combination with an airplane landing gear including a part adapted to be placed under tension should the landing gear be displaced, of a shock absorber for resisting movement of the landing gear including a superimposed tier of rubber discs, an abutment against which said tier of discs bear at one end, and an element fastened to the tension member of the landing gear and to said abutment, said element being so related to the shock absorber as to provide for a compression of said discs in resisting landing gear displacement.

In testimony whereof we hereunto affix our signatures.

HARVEY C. MUMMERT.
WILLIAM L. GILMORE.